Patented Oct. 6, 1936

2,056,164

UNITED STATES PATENT OFFICE 2,056,164

REFINING LEAD

Jesse O. Betterton and Yurii E. Lebedeff, Metuchen, N. J., assignors to American Smelting and Refining Company, New York, N. Y., a corporation of New Jersey No Drawing. Application September 30, 1935, Serial No. 42,974

10 Claims. (Cl. 75—78)

This invention relates to the refining of lead and more particularly to the treatment of lead which has been debismuthized with alkaline earth metal reagents and which contains appreciable quantities of bismuth and residual debismuthizing reagents.

When bismuth is removed from lead by alkaline earth metal reagents, small quantities of the reagents remain in the lead and as these small amounts of residual reagents are often objectionable, it is necessary in such cases to effect their removal. Further, the small amounts of bismuth remaining in the lead after the treatment with the alkaline earth metal reagents are often sufficient to prohibit the use of the lead for many purposes. The present invention provides a process by which the bulk or practically all of these small quantities of bismuth and residual alkaline earth metal reagents may be readily removed from the lead.

In accordance with the invention, lead containing small quantities of bismuth and residual debismuthizing reagents is brought to a proper temperature and antimony and/or arsenic, either in the metallic or alloy form or both, incorporated in the molten bath. As a result a dross forms on the surface of the bath containing the bismuth and alkaline earth metal reagents, which dross may be readily separated from the lead. The small amount of antimony and/or arsenic which enters the bath may be readily and cheaply removed by any of several well-known processes, as by oxidation, etc.

The following specific examples clearly illustrate the efficiency of the invention and how it may be practised.

Example 1

Lead which had been previously debismuthized with calcium and magnesium was charged to an ordinary kettle and the oxide dross formed during the melting down period was removed. At this stage the molten bath weighed 170.4 lbs. and analyzed 0.009% bismuth, 0.039% calcium and 0.10% magnesium. A mixing machine was then installed in the kettle and 0.35 lb. metallic antimony (99.8% pure) was incorporated in the bath at a temperature of 700° F. The bath was mixed for four minutes and skimmed at a temperature of 685° F. A second addition of metallic antimony, 0.45 lb., was then made, the mixing continued for ten minutes and the dross skimmed at 685° F. The bath was then cooled to approximately the freezing point at which temperature the frozen crust was skimmed and the rim which formed around the sides of the kettle was pulled. The bath which then weighed 116.3 lbs. was found to contain 0.001% bismuth, no calcium, 0.008% magnesium and 0.099% antimony. In other words, the process effectively removed 92.2% of the bismuth, 100% of the calcium and 94.5% of the magnesium which were originally present in the lead treated.

Example 2

In this instance 143 tons of lead, which had been previously treated with calcium and magnesium for the removal of bismuth, were melted in an ordinary refining kettle. The molten lead, which contained 0.022% bismuth, 0.036% calcium, 0.034% magnesium and 0.002% antimony, was held at approximately 660° F. and 639 lbs. of lead-antimony alloy incorporated therein by mixing with an ordinary lead mixing machine. The lead-antimony alloy analyzed 90.53% antimony and was added to the bath in successive charges of approximately 50 lbs. each. The molten bath was stirred from 10 to 15 minutes between each addition of antimony alloy. When the last of the lead-antimony alloy had been mixed into the bath, the latter was allowed to settle for a few hours at a temperature of approximately 660° F. and the dross then skimmed from the surface of the molten metal. The refined lead remaining in the kettle was analyzed and found to contain 0.009% bismuth, 0.0028% calcium, 0.004% magnesium and 0.02% antimony.

Example 3

To a bath of lead previously debismuthized with calcium and magnesium and analyzing 0.020% bismuth, 0.057% calcium and 0.036% magnesium, arsenic was added in amounts equal to 1.29 lbs. per ton in the form of an arsenic-lead alloy analyzing 6.2% arsenic. The arsenic-lead alloy was added to the bath at approximately 640° F. via the vortex created by the mixer installed in the kettle. Following incorporation of the alloy, the mixer was removed and the bath held for approximately two hours at a temperature of 635° F. to 650° F. after which the bath was cooled to 630° F. and the metal tapped from beneath the frozen crust. By analysis the metal was found to contain only 0.010% bismuth, 0.038% calcium, 0.016% magnesium and 0.003% arsenic.

Example 4

In this run lead which had been debismuthized with calcium and contained 0.042% bismuth and 0.081% calcium was treated with an arsenic-lead alloy analyzing 7.51% arsenic in an amount equal to 0.69 lb. arsenic per ton. Following the addition of the alloy at a temperature of about 645° F. to 650° F., the mixer was removed and the bath held at 645° F. to 660° F. for two and one-half hours, the dross being skimmed as formed. Thereafter the bath was cooled to freezing, the crust skimmed and one rim removed from the kettle which was then reheated to 660° F. and sampled. The bath analyzed only 0.014% bismuth, 0.053% calcium and 0.006% arsenic.

As previously indicated, either antimony or arsenic or both may be used. Further, they may be added in metallic or alloy form and in single or multiple additions of either or both forms. In treating debismuthized lead, for example, containing 0.043% bismuth and 0.081% calcium, the final lead contained only 0.009% bismuth, 0.025% calcium, no arsenic and 0.003% antimony when treated successively with arsenic-lead and antimony-lead alloys at the rate of 0.31 lb. arsenic and 0.48 lb. antimony per ton followed by an addition of powdered antimony metal in amount equal to 0.57 lb. per ton. While indications are that arsenic may in some cases be slightly more effective with lead of higher residual bismuth content and antimony a bit more effective with lead of lower residual bismuth contents, still extensive experiments have not definitely proven this and for all practical considerations the two elements are to be deemed equivalents as both efficiently effect the simultaneous removal of bismuth and alkaline earth metal reagents from the lead.

It will thus be appreciated that the present invention provides a novel, commercial process for finally refining lead containing small amounts of bismuth and alkaline earth metals which remain in the lead after treatment with alkaline earth metals for the removal of bismuth.

Any small amounts of antimony and/or arsenic remaining in the lead are readily and quickly removed by any of the common oxidation processes or otherwise. Also, it will be apparent that the residual alkaline earth metals content will be sufficiently depleted as a result of the process to easily meet most commercial requirements. However, if desired the metal may be given a final treatment in accordance with the process of United States Letters Patent No. 1,979,442, granted November 6, 1934.

In the specification and claims the term "alkaline earth metals" is used as including magnesium, that element being ordinarily considered as such in the art of debismuthizing lead.

While certain novel features of the invention have been disclosed and are pointed out in the annexed claims, it will be understood that various omissions, substitutions and changes may be made by those skilled in the art without departing from the spirit of the invention.

What is claimed is:

1. The method of refining lead containing relatively small quantities of bismuth and one or more alkaline earth metals which comprises establishing a molten bath of such lead, incorporating antimony and/or arsenic therein thereby concentrating the bismuth and alkaline earth metal content of the bath in a dross and separating said dross from the bath.

2. In treating lead containing bismuth and alkaline earth metal reagents, the improvement which comprises incorporating antimony in a molten bath of said lead at temperatures not exceeding 700° F., thereby forming a bismuth-alkaline earth metal-antimony-lead dross and separating said dross and said bath.

3. The process for simultaneously removing bismuth and alkaline earth metals from lead which comprises establishing a molten bath of said lead, incorporating successive additions of antimony in said lead at temperatures not exceeding 700° F., separately skimming the resultant drosses between said successive additions, lowering the temperature of the bath to approximately its freezing point and removing the resulting crusts and rims from the bath.

4. The process for treating lead previously debismuthized with alkaline earth metal reagents and containing small amounts of both bismuth and debismuthizing reagents which comprises establishing a molten bath of said lead at approximately 660° F., incorporating antimony therein whereby bismuth and alkaline earth metals are simultaneously concentrated as a dross and separating said dross from said molten bath.

5. The process for removing bismuth and alkaline earth metals from lead previously debismuthized with alkaline earth metal reagents which comprises establishing a molten bath of said lead at approximately 660° F., incorporating antimony therein whereby bismuth and alkaline earth metals are simultaneously concentrated as a dross, removing said dross, decreasing the temperature of said bath to approximately its freezing point whereby a crust forms on said bath and separating the molten metal from said crust.

6. The process for treating lead previously debismuthized with alkaline earth metal reagents and which contains relatively small quantities of both bismuth and said reagents which consists of in incorporating antimony in a molten bath of such lead at a temperature not exceeding 700° F., thereby simultaneously concentrating both bismuth and alkaline earth metals as a dross, removing said dross, decreasing the temperature of said bath to approximately its freezing point whereby a crust forms on said bath and separating the molten metal from said crust.

7. The process for refining lead with respect to bismuth as an impurity which comprises debismuthizing said lead with alkaline earth metal reagents, incorporating antimony and/or arsenic in said debismuthized lead in the presence of residual debismuthizing reagents thereby further lowering the bismuth content of the lead and separating the resulting dross from the purified lead.

8. The process for treating lead previously debismuthized by alkaline earth metal reagent which comprises incorporating a metal of the group consisting of antimony and arsenic in a molten bath of said lead, skimming the resulting dross from the bath, cooling the bath to approximately its freezing point and separating purified lead from the crusts formed at the lower temperature.

9. In debismuthizing lead with alkaline earth metal reagents, the improvement which comprises adding a lead alloy of a metal selected from the group consisting of antimony and arsenic to the debismuthized lead following the separation of the bismuth-alkaline earth metal-lead dross therefrom whereby residual alkaline earth metal reagents and bismuth in the debismuthized lead are concentrated in a dross.

10. The process for refining lead with respect to bismuth as a contaminant which comprises first debismuthizing the lead with alkaline earth metal reagents, thereafter forming a dross of residual bismuth and alkaline earth metal reagents by incorporating arsenic in the debismuthized lead and finally effectng a separation between the resulting alkaline earth metal-arsenic-bismuth-lead dross and the refined lead.

JESSE O. BETTERTON.
YURII E. LEBEDEFF.